United States Patent
Goossens et al.

(10) Patent No.: US 8,048,971 B2
(45) Date of Patent: Nov. 1, 2011

(54) PROCESS FOR THE PRODUCTION OF POLYETHYLENE AND ETHYLENE COPOLYMERS

(75) Inventors: Ivo T. Goossens, Kapelle-Op-Den-Bos (BE); Philip H. Cornelissen, Heverlee (BE); Jan J. Naets, Leuven (BE); Henri A. Lammens, Antwerp (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 87 days.

(21) Appl. No.: 12/299,742

(22) PCT Filed: Apr. 4, 2007

(86) PCT No.: PCT/EP2007/003041
§ 371 (c)(1),
(2), (4) Date: Sep. 22, 2009

(87) PCT Pub. No.: WO2007/134671
PCT Pub. Date: Nov. 29, 2007

(65) Prior Publication Data
US 2010/0004407 A1  Jan. 7, 2010

(30) Foreign Application Priority Data
May 19, 2006  (GB) .................................. 0609974.1

(51) Int. Cl.
C08F 2/00 (2006.01)
C08F 110/02 (2006.01)
B01J 19/00 (2006.01)
(52) U.S. Cl. ............................ 526/64; 526/352; 422/131
(58) Field of Classification Search .................... 526/68, 526/72, 348, 352
See application file for complete search history.

(56) References Cited

U.S. PATENT DOCUMENTS

| | | | | |
|---|---|---|---|---|
| 3,306,889 A | * | 2/1967 | Schappert | 526/68 |
| 3,627,746 A | * | 12/1971 | Beals et al. | 526/64 |
| 3,714,123 A | * | 1/1973 | Mancini et al. | 526/64 |
| 4,027,085 A | | 5/1977 | Clemmer et al. | |
| 4,215,207 A | * | 7/1980 | Durand et al. | 526/64 |
| 4,255,387 A | | 3/1981 | Gardner | |
| 4,342,853 A | | 8/1982 | Durand et al. | |

FOREIGN PATENT DOCUMENTS

| GB | 2134121 | 8/1984 |
|---|---|---|
| WO | WO 2004/027264 | 4/2004 |

* cited by examiner

*Primary Examiner* — David W Wu
*Assistant Examiner* — Elkizabeth Eng
(74) *Attorney, Agent, or Firm* — Frank E. Reid; Robert L. Abdon

(57) ABSTRACT

The invention provides a process and an apparatus for the high pressure polymerization of ethylene in which a jet pump is used to pump a fluid into a polymer/monomer product mixture leaving a bumped tubular reactor. The fluid may be recycled monomer or another fluid such as a modifier.

10 Claims, 2 Drawing Sheets

PROCESS FOR THE PRODUCTION OF POLYETHYLENE AND ETHYLENE COPOLYMERS

CROSS-REFERENCE TO RELATED APPLICATIONS

This application is a National Stage Application of International Application No. PCT/EP2007/003041 filed Apr. 4, 2007, which claims priority to Great Britain Patent Application No. 0609974.1, filed May 19, 2006, both of which are incorporated herein by reference.

FIELD OF THE INVENTION

The invention relates to a process and an apparatus for polymerizing ethylene under high pressure, generally using a free radical polymerization mechanism, optionally in the presence of comonomers. In particular, the invention relates to a process and an apparatus in which the polymerization of ethylene, optionally with one or more comonomers, is carried out in a tubular reactor.

BACKGROUND OF THE INVENTION

High pressure tubular reactors are widely used for the polymerization of ethylene at high pressure, for example, pressures of over 1000 bar, and up to 3000 bar or higher. Such tubular reactors are typically very long, for example more than 1000 meters long and are provided along their length with cooling jackets, injection ports for initiator, ethylene side streams and comonomer, as well as various ancillary equipment such as temperature sensors. Fresh ethylene from an ethylene supply is compressed to reactor pressure typically by a combination of a primary compressor which compresses the ethylene to an intermediate pressure, say, around 300 bar, and a secondary compressor which compresses the fresh ethylene together with recycled ethylene from that intermediate pressure up to the final reactor pressure. The ethylene is then usually heated in a pre-heater to a temperature suitable for the initiators to be used before being fed into the front end of the tubular reactor. As the ethylene flows along the tubular reactor initiator (and optionally comonomer) is injected, usually at several points along the length of the tubular reactor, and the ethylene polymerized to give a mixture comprising principally polymer and unreacted monomer. That mixture leaves the reactor through a valve, which is generally referred to as a high pressure let down valve, and then enters a separation system in which unreacted monomer is separated from the polymer and recycled back to the suction of the secondary compressor.

Various forms of separation system are known. One such known separation system includes two separation vessels arranged in series. The first separation vessel, sometimes referred to as the high pressure vessel, has an inlet for the product mixture coming from the high pressure let down valve, an outlet for the separated unreacted monomer gas (referred to as "off gas") and an outlet in the bottom of the vessel for the polymer. That polymer, which still contains, say, 30 to 40 wt % of ethylene, passes from the outlet of the first vessel through a conduit into the second vessel, often referred to as the low pressure vessel, where almost all of the remaining ethylene separates off. That off gas is removed through an upper outlet as off gas leaving the molten polymer to flow through an outlet in the bottom of the vessel. Typically, the high pressure vessel will operate at a pressure such that the off gas can be returned, via a recycle system, to the suction of the secondary compressor. The low pressure separator operates at a much lower pressure, and the off gas from the low pressure separator must be compressed in a further compressor (known as a "purge compressor" which may be part of the primary compressor) before being sent to the secondary compressor.

The molten polymer leaving the separation system is generally extruded and cooled to give a solid product, typically in pellet form, which is sent for storage or to other product handling facilities.

The polymerization of ethylene is an exothermic process which generates heat thereby causing the temperature of the monomer/polymer mixture to rise to a peak downstream of an initiator injection point and then to fall under the influence of the cooling applied to the tubular reactor. Where there are several initiator injection points along the length of the reactor the temperature of the monomer/polymer mixture will rise and fall several times as it travels along the length of the reactor, such that the temperature profile of the mixture along the length of the reactor is an undulating curve. Cooling of the product mixture in the tubular reactor is hindered by the necessarily thick walls of the reactor and effective cooling therefore requires long sections of cooling jacket. Another factor hindering cooling is the formation of a lamina flow region adjacent the inside wall of the tubular reactor which inhibits heat transfer out of the reactor. That laminar flow region increases in thickness as the viscosity of the product mixture increases along the length of the reactor, and is particularly significant when a high viscosity grade of polymer is being produced. In order to disrupt that region of laminar flow, some tubular reactors are bumped, that is, the high pressure let down valve is briefly opened up at regular intervals to give a sudden increase in the flow rate through the reactor and thereby improve heat transfer out of the reactor.

In some polymerization plants the product mixture is further cooled after it has left the tubular reactor by injecting cold ethylene into it as a "quench", prior to the entry into the separation system. The use of a "quench", however, has some disadvantages. In particular, the cold ethylene must be compressed in order to raise it to a pressure at which it can be injected into the flow of product mixture from the reactor. That compression requires energy and the compressor has also an associated maintenance cost.

U.S. Pat. No. 4,255,387 focuses on the use of rupture discs in an HPPE reactor with possible use of a bump cycle. However the use of a jet pump to introduce a fluid flow into the product mixture is not mentioned. GB2134121 addresses use of an anti-foam agent in the production of catalytically polymerized linear low density polyethylene, as opposed to a non-linear low density polyethylene material produced by the use of free radical initiators. The invention specifically addresses polyethylene production using an initiators injection system. U.S. Pat. No. 3,714,123 describes high pressure polymerization using bumping; however the use of a jet pump is not mentioned. U.S. Pat. No. 4,027,085 describes control of the peak temperature in the reactor the use of pulsing. However, the use of jet pumps to optimize operation is not disclosed.

SUMMARY OF THE INVENTION

The present invention provides a process for producing polyethylene and ethylene copolymers comprising polymerizing ethylene, optionally in the presence of one or more comonomers, in a tubular reactor while bumping the reactor pressure to produce a product mixture comprising polymer and unreacted monomer, passing the product mixture through a high pressure let down valve, using a jet pump to pump a fluid into the product mixture, and passing the product mixture including the fluid into a separation system.

The invention is especially applicable to polymerization processes using a free radical polymerization mechanism and especially such polymerization using a pulsating pressure regime, sometimes referred to as a bump cycle. The processes may use oxygen or preferably initiators, such as peroxides, and may use an initiator injection system. Using the invention, a jet pump (Venturi) downstream of the high pressure letdown valve can introduce a quench stream to cool down the product mixture exiting the tubular reactor while accommodating and being effective during a pulsating (cycling) pressure regime.

The present inventors have found unexpectedly that a jet pump can be used to pump a fluid into the stream of product mixture flowing from the high pressure let down valve of a bumped tubular reactor. Jet pumps, by their nature, rely on the energy of a flowing stream of material to provide the driving force for the pumping. It is therefore surprising that a jet pump can be used effectively and reliably on a bumped tube reactor because the flow rate of the product stream is subject to such large variations though the bumping cycle. For example, in a bumped tubular reactor polymerization plant operated by the Applicant, a jet pump has been found to work effectively and reliably with an unexpectedly high pumping capacity even though the flow rate of the product stream rises very rapidly from 85 tonnes/hour to 300 tonnes/hour and then falls back again during a bump. Such flow rate variations would be expected to cause very rapid decreases in pressure in the suction line of the jet pump to occur during a bump which would in turn cause a very rapid temperature decrease in the gas in that time which might result in the condensation of ethylene as a liquid and brittle fracture of the suction line. However, the present inventors have unexpectedly found that no such problems actually occur in practice.

Jet pumps are based on the same principles as ejectors. According to the Bernoulli principle, as the speed of a moving liquid or gas increases, the pressure within the liquid or gas decreases. A high velocity jet emerging from a nozzle into a diffuser will create a suction which will entrain gas from a secondary stream. Typically, in the application of a jet pump in the process and apparatus of the invention the high pressure product stream downstream of the high pressure let down valve expands and flows through a nozzle to produce a high velocity jet which generates a region of low pressure. The jet pump includes an inlet into that region of low pressure through which the fluid is drawn. Downstream of the nozzle, the product mixture and the fluid mix together.

Jet pumps are capable of pumping both gases and liquids and are known for use in a wide variety of applications including the pumping of water from deep boreholes and in oilfield applications. SembCorp Simon Carves Ltd of Cheadle Hume in the UK is one company which has been involved in the design and installation of jet pumps handling high pressure fluids.

The fluid which is pumped into the monomer/polymer product mixture will be at a lower pressure than that product mixture. The energy used to bring that fluid into the stream of product mixture comes from the flow of the product mixture itself and there is therefore no external energy cost, in contrast to a conventional compressor.

In one embodiment the fluid comprises monomer at a temperature lower than the temperature of the product mixture. That monomer will then act as a quench, cooling the product mixture before it enters the separation system. Optionally, the fluid is recycled monomer from the recycle system. Preferably, the recycled monomer is taken from a location upstream of at least one of the recycle system coolers. In that way, the burden on the recycle cooling system is reduced. Preferably, the recycled monomer is taken from a location upstream of all of the recycle system coolers. (A cooler is a heat exchanger in which heat transfers from the recycle monomer stream to a cooling fluid such as chilled water which is then circulated to a cooling or refrigeration system and is distinguished from a waste heat boiler which generates steam.)

The monomer may be fresh ethylene from an ethylene supply. In that embodiment, once again the ethylene is compressed by the jet pump with no external energy required.

The term "monomer" as used herein refers to ethylene and to any mixture of ethylene with one or more comonomers. Comonomers suitable for copolymerization with ethylene under high pressure include vinyl ethers such as vinyl methyl ether and vinyl phenyl ether, olefins such as propylene, 1-butene, 1-octene and styrene, vinyl esters such as vinyl acetate, vinyl butyrate and vinyl pivalate, haloolefins such as vinyl fluoride and vinylidene fluoride, acrylic esters such as methyl acrylate, ethyl acrylate and methacrylates, other acrylic or methacrylic compounds such as acrylic acid, methacrylic acid, maleic acid, acrylonitrile and the acrylamides, and other compounds such as allyl alcohol, vinyl silanes, and other copolymerisable vinyl compounds.

The fluid pumped into the product stream by the jet pump may comprise off gas from a separation vessel of the separation system. In many cases, the off gas from the first separation vessel is at a pressure corresponding to the pressure of the secondary compressor suction and so that off gas is returned via the recycle system to the secondary compressor. Off gas from the second separation vessel will be of lower pressure than the off gas from the first vessel and must be compressed before being returned to the secondary compressor. Preferably, off gas returned to the jet pump is at a pressure lower than the pressure in the recycle system. After that off gas has combined with the product stream in the jet pump it will be carried back into the first separation vessel where a portion of it will be separated off and sent back to the secondary compressor via the recycle system. Overall, therefore, the use of the jet pump increases the proportion of the unreacted monomer which is sent back to the secondary compressor via the recycle system. In that way, the cost of the energy required to compress off gas so it can be returned to the secondary compressor is reduced. Off gas from the separation vessels typically has a temperature which is only marginally lower than that of the product mixture and so there will typically only be a small cooling effect, if any, when the fluid entering the suction of the jet pump is off gas from a separation vessel.

The fluid may comprise a modifier or any other component which it is desired to combine into the monomer/polymer product stream. Such components can be drawn from a low pressure supply of the component and pumped into the product flow by the jet pump.

As mentioned above, bumping is carried out principally in order to decrease the thickness of the laminar flow region inside the tubular reactor, thereby improving heat transfer out of the reactor and, in some cases, improving the reliability of temperature measurements inside the reactor. Typically, the bumping will be effected by briefly opening up the high pressure let down valve at regular intervals. The high pressure let down valve is a control valve, that is, the degree to which it is closed (the valve position) can be varied from 100% (fully shut) to 0% (fully open). When the reactor is not undergoing a bump, the high pressure let down valve is controlled in response to the set point reactor pressure, that is, the position of the high pressure let down valve is continuously adjusted to maintain the reactor pressure at a desired value, say, 3000 bar, and the position of the high pressure let down valve will therefore vary only slightly over time in response to minor pressure variations. To bump the reactor, the high pressure let down valve is opened up briefly. For example, it may be opened up from 70% closed to 65% closed (i.e. opened up by a further 5% of its range) and then closed again. During a bump, the high pressure let down valve typically opens up by at least 2%, preferably by at least 3% of its range. The precise degree of change of the high pressure let down valve position will depend on how much it is desired to increase the flow from the reactor. The valve may open to any desired extent including to a fully open condition. Optionally, the high pressure let down valve will change position during a bump by no more than 15%, optionally no more than 10% of its range.

The time between the valve starting to open up from its usual position e.g. 70% closed, to the time at which it returns to that position is referred to as the dwell time. The dwell time is optionally in the range of from 0.1 to 5 seconds, and is preferably in the range of from 0.5 to 1.5 seconds. Of course, the high pressure let down valve takes a finite amount of time to open and close and so the length of time which the high pressure let down valve is at its most open position will be less than the dwell time. For example, for a dwell time of 1.00 seconds, the high pressure let down valve may be at its most open position (for example, 65% closed) for only 0.70 seconds.

The reactor will typically be bumped at regular intervals. The bumping frequency may be chosen according to the molecular weight of the polymer grade being produced. Higher the molecular weight grades will typically require more frequent bumping because the thickness of the flow region will increase in relation to the viscosity of the reactor contents. Thus, for a high melt index grade, the interval between bumps may be, say, 300 or 400 seconds, whereas for a lower melt index grade it may be less, perhaps 45 or 60 seconds. In most cases, however, the reactor will be bumped at a frequency of at least once every 10 minutes. Optionally, the reactor will be bumped at a frequency of from 0.1 to 5 times per minute, advantageously in the range of from 0.2 to 3 times per minute.

During the bump, the flow rate through the high pressure let down valve will increase rapidly as the high pressure let down valve opens. Advantageously, the flow rate increases by a factor in the range of from 100 to 1000%, preferably in the range of from 200 to 500%. There will, of course, also be a corresponding increase in flow rate through the jet pump and through other downstream equipment. The separation vessels, due to their size, will typically exert a buffering effect and unless the variations in flow rate caused by bumping are very large they will often not extend downstream of the separation system, for example, into the recycle system.

During a bump, the reactor pressure will decrease briefly. That decrease in pressure will typically be detectably all the way back to the outlet of the secondary compressor. In order to avoid problems associated with plugging by polymer, reactor pressure sensors are often located between the outlet of the secondary compressor and the first initiator injection point. For example, a pressure sensor may be located on the preheater. The pressure in that region of a tubular polymerization reactor during normal operation is typically more than 1000 bar, advantageously more than 2000 bar, and preferably more than 2500 bar. The pressure in that region of the apparatus may decrease from, say, 3000 bar to, say, 2900 bar during a bump. Preferably, during a bump the pressure decreases at a location upstream of the first initiator injection point by at least 40 bar, advantageously at least 50 bar and preferably at least 60 bar. In most cases the pressure drop at that point will be less than 500 bar, for example, less than 300 bar.

The invention also provides the use, in an apparatus for the polymerization of ethylene and, optionally, one or more comonomers, of a jet pump located downstream of a bumped tubular reactor to introduce a fluid into a stream of product mixture flowing from the reactor.

The invention further provides an apparatus for the high pressure polymerization of ethylene under bumped conditions, optionally with one or more comonomers, comprising
  a tubular reactor for the polymerization of monomer to produce a product mixture comprising polymer and unreacted monomer,
  a high pressure let down valve downstream of the reactor for controlling the flow of product mixture from the reactor,
  a jet pump downstream of the high pressure let down valve for pumping a fluid into the product mixture, and
  a separation system for separating the polymer from unreacted monomer.

The various components of the apparatus will be connected by conduits as appropriate for the flow of material between them. The conduits may include such auxiliary equipment such as valves, heat exchangers and sensors as may be desired.

The conduit downstream of the high pressure let down valve may include, for example, a product cooler, that is, a length of conduit having a cooling jacket. The jet pump may be located upstream or downstream of or within the product cooler.

The jet pump is located downstream of the high pressure let down valve and upstream of the first separation vessel. The jet pump may communicate with the recycle system via a conduit for carrying monomer from the recycle system to the jet pump. The jet pump may communicate with a separation vessel of the separation system, especially the second separation vessel, via a conduit for carrying off gas from that vessel to the jet pump.

The term "monomer" as used herein refers to ethylene and to any mixture of ethylene with one or more comonomers. Comonomers suitable for copolymerization with ethylene under high pressure include vinyl ethers such as vinyl methyl ether and vinyl phenyl ether, olefins such as propylene, 1-butene, 1-octene and styrene, vinyl esters such as vinyl acetate, vinyl butyrate and vinyl pivalate, haloolefins such as vinyl fluoride and vinylidene fluoride, acrylic esters such as methyl acrylate, ethyl acrylate and methacrylates, other acrylic or methacrylic compounds such as acrylic acid, methacrylic acid, maleic acid, acrylonitrile and the acrylamides, and other compounds such as allyl alcohol, vinyl silanes, and other copolymerisable vinyl compounds.

The product stream leaving the reactor will include, in addition to polymer and unreacted monomer, other substances such as initiator residues and optionally one or more chain transfer agents.

Many suitable initiators are known to the skilled person. Organic peroxides are a preferred class of initiators. Typically, a mixture of several initiators having different decomposition temperature will be used in order to provide ongoing generation of free radicals as the temperature of the reaction mixture rises.

The skilled person will also be aware of many suitable chain transfer agents (referred to herein also as "modifiers"). Examples include propylene, 1-butene, carbon tetrachloride, and propionaldehyde. Chain transfer agents are described in Adv. Polym. Sci, Vol. 7, 386-448 (1970).

The terms "upstream" and "downstream" as used herein are used with reference to the direction of the flow of monomer and polymer through the apparatus beginning with the ethylene source and going through to the finished polymer storage facilities, unless another meaning is clear from the context.

The separation vessels may be of any suitable form. Each separation vessel preferably has an upper cylindrical portion, into which the inlet for the product mixture from upstream empties and from which an outlet for off gas leads, and a lower portion of inverted conical form in which the concentrated polymer phase is collected and which has at its lowest extremity an outlet through which the concentrated polymer phase leaves the separation vessel. One or more of the vessels may have tangential inlets. Tangential inlets can give improved separation by causing the product mixture to swirl around a central axis in the manner of a cyclone.

The polymer leaving the last separation vessel preferably flows into the intake of an extruder in which the polymer is typically combined with an additives package, extruded, cooled and chopped into pellets. The pellets may then be bagged or sent to storage sites or other product handling facilities.

The off gas from the first separation vessel is typically returned to the suction of the secondary compressor via a recycle system. The recycle system will usually comprise at least one waste heat boiler for the generation of steam using the heat of the off gas. That steam can be used elsewhere in the system, for example, in the preheater. After the boilers, the recycle monomer gas typically passes through one or more coolers. Each cooler is preferably followed by a knock-out pot for the collection of waxes. The coolers will usually use cooling water and/or chilled water from a refrigeration system.

BRIEF DESCRIPTION OF THE DRAWINGS

The invention will now be described for the purpose of illustration only with reference to the Figures in which.

DETAILED DESCRIPTION OF THE INVENTION

Figure 1:
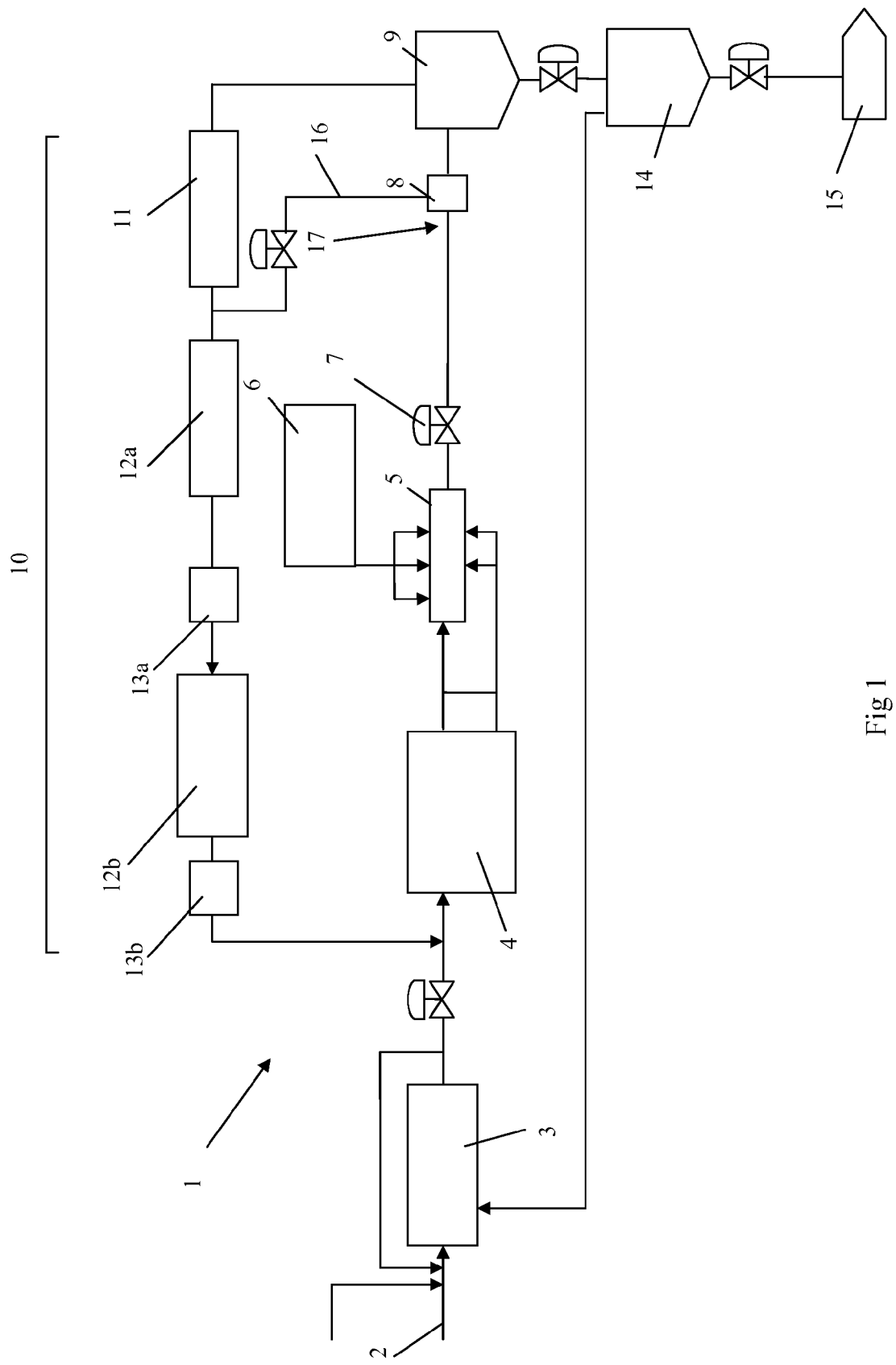
FIG. 1 is a schematic diagram of an apparatus according to the invention comprising a tubular reactor.

FIG. 1 shows a polymerization plant 1 including an ethylene feed line 2 which supplies ethylene at a pressure of 70 bar to a primary compressor 3 which compresses the ethylene to a pressure of approximately 300 bar. The outlet of the primary compressor 3 communicates through a conduit having a valve with the inlet of secondary compressor 4 and with a conduit for the return of recycled ethylene from the recycle system. That secondary compressor 4 is a two-stage reciprocating compressor and compresses the ethylene and other reaction components to a pressure of 3000 bar. The compressed ethylene leaving the secondary compressor 4 is split into two streams, one of which enters the front end of a bumped tubular reactor 5 and the other being split into one or more sidestreams which enter the bumped tubular reactor 5 at points along its length. The tubular reactor is also provided along its length with several initiator injection points which are fed from the initiator injection system 6.

From the tubular reactor 5 the mixture of polymer and unreacted monomer passes through high pressure let down valve 7. The position of that high pressure let down valve 7 is controlled to maintain a pressure of 3000 bar in the tubular reactor and for most of the time is around 70% closed. However, once every 300 seconds the high pressure let down valve 7 is opened up a further 5% for a dwell time of 0.85 seconds, thereby bumping the tubular reactor 5 and increasing the flow rate through the high pressure let down valve 7 by 250% during the bump. From the high pressure let down valve 7, the product flows through a conduit 17 into jet pump 8 (described below and shown in more detail in FIG. 2) and then into first separation vessel 9. As depicted in FIG. 1, that separation vessel has an upper, generally cylindrical portion and a lower, inverted conical portion. The product mixture enters the first separation vessel through an inlet set into the cylindrical wall of the upper part of the reactor and, once inside the first separation vessel 9, rapidly separates into a stream of unreacted monomer gas and a polymer rich liquid phase which collects in the lower part of the separation vessel 9. The monomer gas leaves the first separation vessel 9 as off gas via an outlet set in the upper surface of that vessel and passes via a conduit to a recycle system 10. That recycle system 10 includes a waste heat boiler 11, coolers 12a and 12b for cooling the monomer gas and knock out pots 13a and 13b for dewaxing. The monomer gas leaves the recycle system 10 and flows back to the outlet of the primary compressor where it combines with fresh ethylene prior to entering the inlet of the secondary compressor 4. The first pressure vessel 9 operates at a pressure equal to or slightly higher than the 300 bar pressure at the inlet of the secondary compressor, and so there is no need to compress the off gas from that vessel before it reaches secondary compressor 4.

The concentrated polymer/monomer mixture leaves the first separation vessel 9 via an outlet set in the bottom of the conical portion of that vessel and passes through a valved conduit into the upper part of the second separation vessel 14. That second separation vessel 14 is similar in shape to the first separation vessel and operates at a pressure in the region of from 0.5 to 1.0 barg and almost all of the remaining monomer is separated off as off gas which leaves that vessel via an outlet set in the upper portion of the vessel. The off gas from the second separation vessel 14 passes via a conduit equipped with heat exchangers (not shown in FIG. 1) to the primary compressor 3, four cylinders of which are dedicated to acting as purge compressor. Following compression to 300 bar, the off gas, in combination with purge gas from other parts of the installation, is combined in the primary compressor with the fresh ethylene from source 2.

The molten polymer leaves the second separation vessel 14 via an outlet in the bottom of that vessel and passes through a short conduit into the intake of an extruder 15 which extrudes the polymer into strings which are chopped, cooled and transferred to product storage bins (not shown in FIG. 1).

Conduit 16 carries gas from the recycle system 10 to the suction of the jet pump 8, where it is drawn into and combines with the product mixture passing along conduit 17 from the high pressure let down valve 7 to the first separation vessel 9, thereby cooling that mixture. In FIG. 1 the conduit 16 is shown as taking the recycle gas from a point immediately downstream of the waste heat boiler 11. However, in an alternative embodiment, conduit 16 takes recycle gas from a point downstream of the knock out pot 13b. In that embodiment, recycle gas has passed through coolers 12a, 12b and is cooler than the recycle gas immediately downstream of waste heat boiler 11 and therefore is more effective as a quench. However, taking the recycle gas from upstream of the coolers 12a, 12b as shown in FIG. 1 reduces the burden on the cooling water and/or refrigeration system which supplies coolers 12a, 12b.

Figure 2:
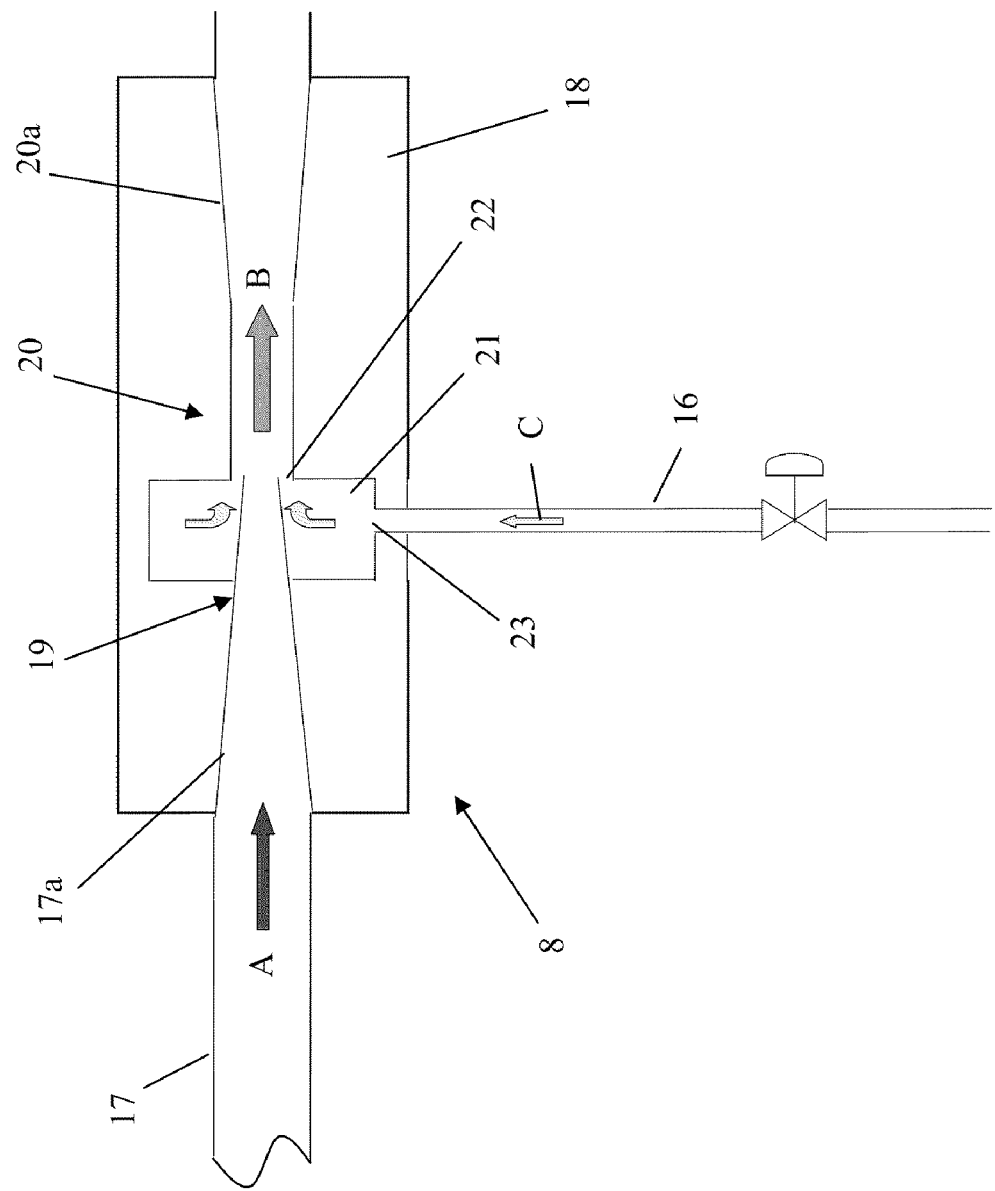
FIG. 2 depicts a jet pump as used in the apparatus of FIG. 1.

The jet pump 8 is shown in greater detail in FIG. 2. The product mixture flows through the high pressure let down valve 7 along conduit 17 in the direction of arrow A into the jet pump 8. The jet pump 8 is constructed of high strength steel and comprises a generally cylindrical outer body 18 into one end of which the conduit 17 enters. Once inside the body 18 the conduit 17 tapers in a tapered portion 17a down to form nozzle 19. The flow velocity of the product mixture increases in the tapered portion of conduit 17 and it leaves the nozzle 19 as a high velocity jet (see arrow B) which projects into a conduit 20 which is coaxial with the nozzle 19 but of slightly larger diameter. After a short distance, the conduit 20 begins to taper outwards in a tapered portion 20a (referred to as a "diffuser") until it is at a diameter similar to that of conduit 17.

The product mixture then leaves the jet pump and flows via a conduit to the first separation vessel 9 (not shown in FIG. 2).

As can be seen from FIG. 2, surrounding the nozzle 19 is a short cylindrical chamber 21, which is coaxial with nozzle 19 and opens into conduit 20. Nozzle 19 extends through that chamber 21 and terminates just at the entrance of conduit 20, thereby defining a narrow annular gap 22 between the rim of the nozzle 19 and the conduit 20.

The cool recycle gas from the recycle system 10 flows along conduit 16 in the direction of arrow C and through an inlet 23 into the chamber 21. The jet of product mixture emerging from nozzle 19 is at a velocity sufficient that its pressure is lower than that of the recycle gas in chamber 21. That cool recycle gas accordingly flows through the annular gap 22 and combines with the product mixture in diffuser 20a thereby reducing its temperature.

The flow rate of product mixture through the high pressure let down valve and the jet pump is on average about 85 tonnes/hour but rises during a bump to a peak of 300 tonnes/hour. Despite that flow variation, the jet pump 8 pumps 40 tonnes/hour of recycle ethylene into the product mixture reliably and efficiently.

The jet pump 8 has no moving parts and is therefore low maintenance. Moreover, the jet pump is driven by the flow of the product stream and so the cool recycle gas is pumped into the product stream without using any energy from an external source.

Although preferred embodiments have been depicted and described in detail herein, it will be apparent to those skilled in the relevant art that various modifications, additions, substitutions, and the like can be made without departing from the spirit of the invention and these are, therefore, considered to be within the scope of the invention as defined in the claims which follow. To the extent that our description is specific, this is solely for the purpose of illustrating preferred embodiments of our invention and should not be taken as limiting our invention to these specific embodiments. The use of subheadings in the description is intended to assist and is not intended to limit the scope of our invention in any way.

The invention claimed is:

1. A process for producing polyethylene or ethylene copolymers comprising
    polymerizing ethylene, optionally in the presence of one or more comonomers, in a tubular reactor while bumping the reactor pressure to produce a product mixture comprising polymer and unreacted monomer,
    passing the product mixture through a high pressure let down valve which changes by no more than 15% of its opening range to effect a pressure bump,
    passing recycled monomer to a jet pump to pump said recycled monomer into the product mixture exiting said let down valve,
    passing the product mixture including the recycled monomer into a separation system for the separation of polymer from unreacted monomer, and
    recycling said unreacted monomer through a recycle system,
    wherein at least a portion of the recycled monomer is taken from a location downstream of a waste heat boiler and upstream of any recycle system coolers and passed into said jet pump.

2. The process of claim 1, wherein the recycled monomer comprises monomer taken as off gas from a separation vessel in the separation system.

3. The process of claim 1, wherein the bumping is effected by moving the high pressure let down valve to a more open position for a predetermined period of time.

4. A process as claimed in claim 1 in which during a bump the high pressure let down valve opens by at least 2% of its range.

5. The process of claim 1, wherein the bumping frequency is at least once every ten minutes.

6. The process of claim 1, wherein the pressure at a location upstream of the tubular reactor decreases by at least 40 bar during a bump.

7. The process of claim 1, wherein the flow rate of product mixture into the jet pump increases by at least 100% during a bump.

8. An apparatus for the high pressure polymerization of ethylene under bumped conditions, optionally with one or more comonomers, comprising
    a tubular reactor for the polymerization of monomer to produce a product mixture comprising polymer and unreacted monomer,
    a high pressure let down valve downstream of the reactor for controlling the flow of product mixture from the reactor,
    a jet pump downstream of the high pressure let down valve for pumping a recycled monomer into the product mixture, and
    a separation system for separating the polymer from unreacted monomer, and
    an unreacted monomer recycle system comprising at least one conduit located downstream of a waste heat boiler and upstream of any recycle system coolers, for conducting at least a portion of said unreacted monomer from said recycle system to said jet pump.

9. The apparatus of claim 8, wherein the suction of the jet pump communicates with the recycle system via said conduit for the flow of recycle monomer from the recycle system to the jet pump.

10. The apparatus of claim 9, wherein the suction of the jet pump communicates with a separation vessel of the separation system via said conduit for the flow of off gas from the separation vessel to the jet pump.

* * * * *